Sept. 5, 1939.  M. H. LOUGHRIDGE  2,171,579
LIQUID CONTROL SYSTEM
Filed Oct. 28, 1935  3 Sheets-Sheet 1

INVENTOR.
M. H. Loughridge

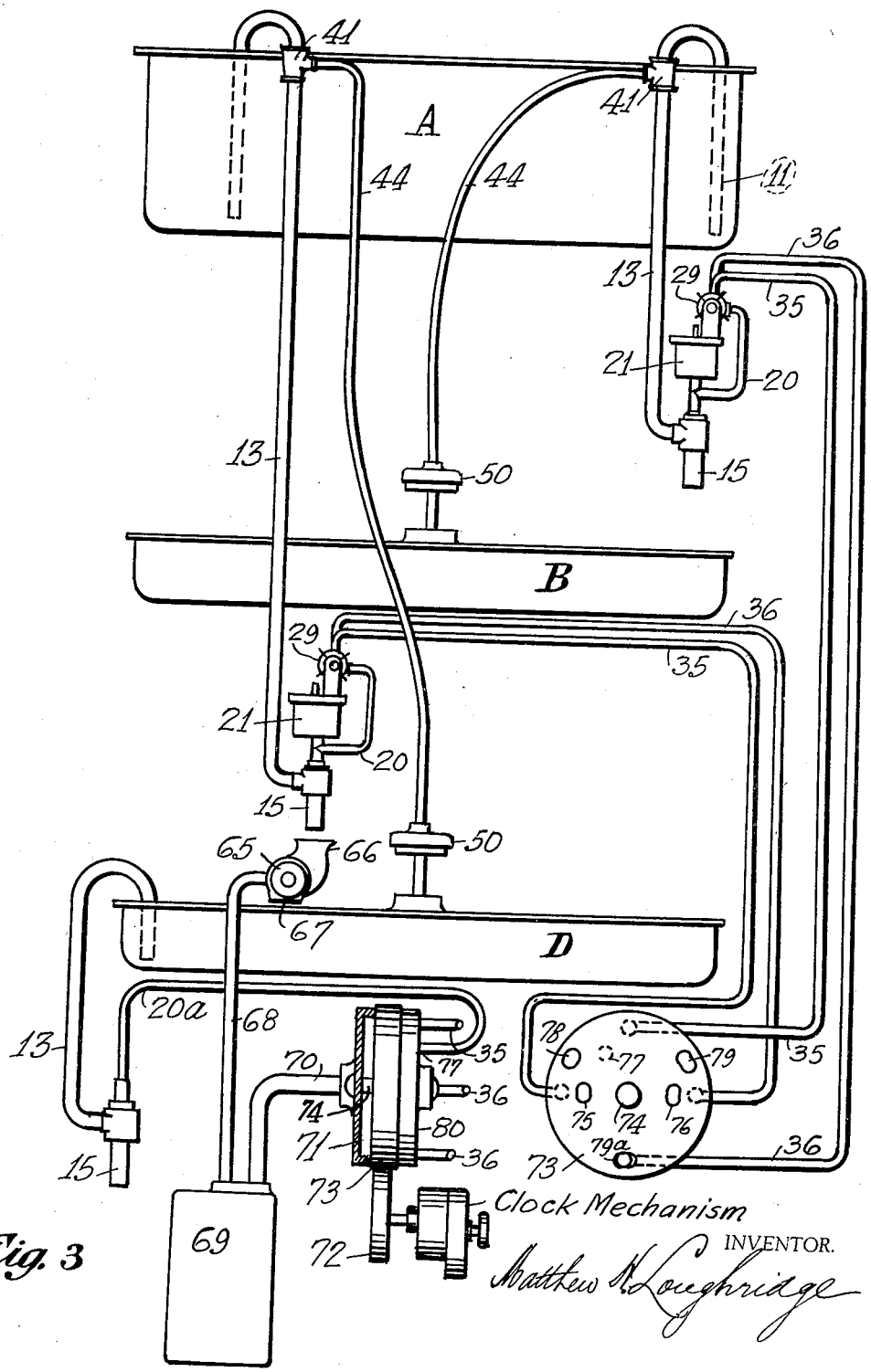

Sept. 5, 1939.  M. H. LOUGHRIDGE  2,171,579
LIQUID CONTROL SYSTEM
Filed Oct. 28, 1935  3 Sheets-Sheet 3

INVENTOR.
Matthew H. Loughridge

Patented Sept. 5, 1939

2,171,579

UNITED STATES PATENT OFFICE 2,171,579

LIQUID CONTROL SYSTEM

Matthew H. Loughridge, Bogota, N. J.

Application October 28, 1935, Serial No. 47,045

18 Claims. (Cl. 137—20)

This invention relates to liquid control systems and has for an object to control the flow of liquids from a higher to a lower level. A more particular object of the invention is to control the flow of liquids at predetermined intervals, or under predetermined conditions in which one or more tanks may be filled and emptied as desired. Another object of the invention is to control the flow of liquids by a syphon system, automatically regulated; and another object of the invention is to provide means for starting a syphon by a Venturi action in which the starting means is stopped automatically as soon as the syphon is started.

Other objects of the invention will appear from the following specification and from the accompanying drawings, in which;

Fig. 3 is a diagram of the Venturi syphon control operated by a time controlled mechanism;

Figures 1, 2:
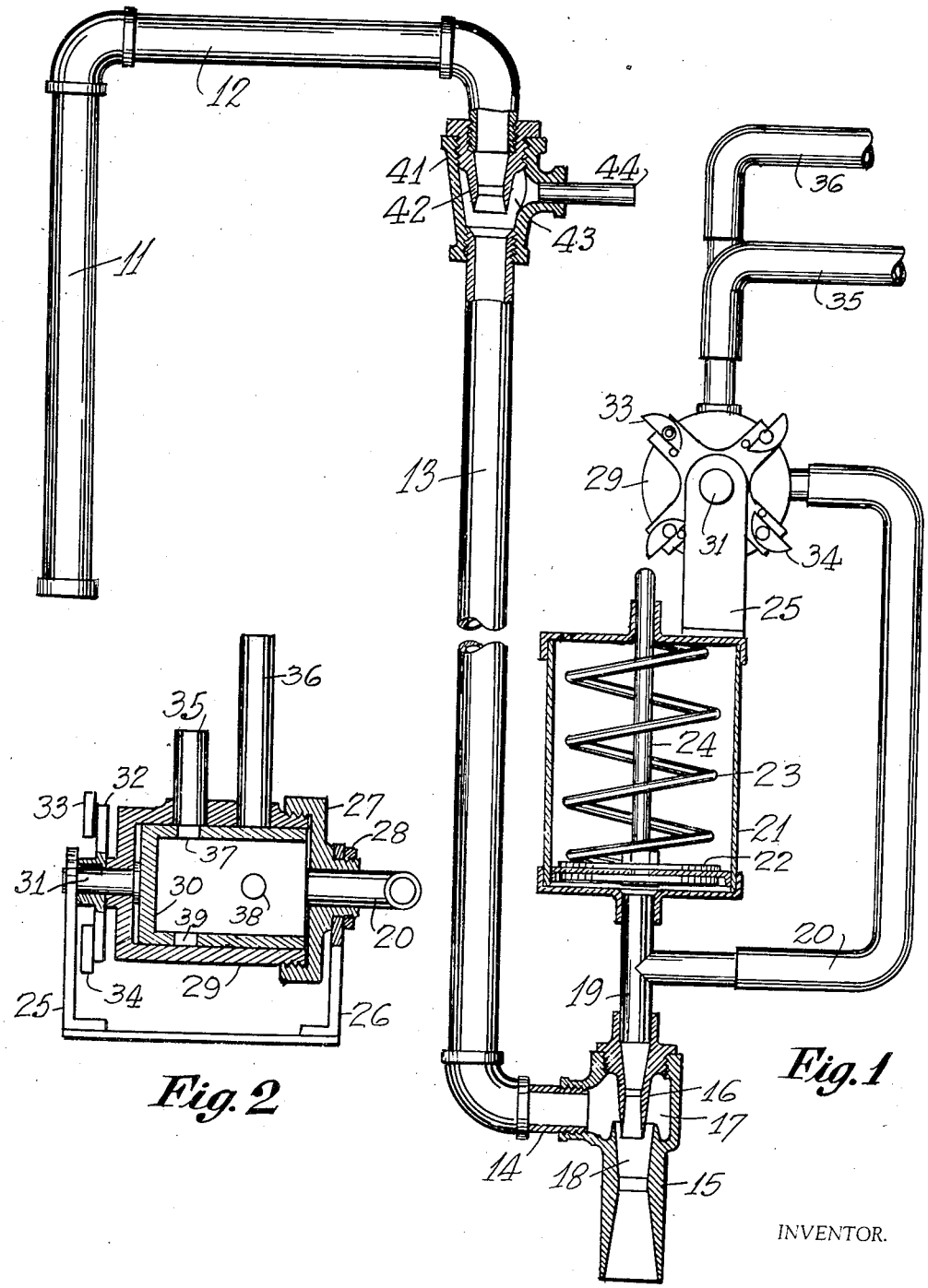
Fig. 1 is a Venturi syphon with automatic controls, partly sectioned.
Fig. 2 is a sectional drawing of a valve for controlling the Venturi syphon.

One of the applications of this invention is to transfer liquids from a tank at a higher lever to one or more tanks at a lower level at intervals that may be determined manually, or by a time controlled mechanism. The application also includes discharging the lower tanks at predetermined intervals, also stopping the flow to these tanks as they become filled.

The Venturi syphon as disclosed in my co-pending application, Serial No. 755,841, of December 3, 1934, now Patent No. 2,131,743, granted October 4, 1938, may be used for carrying out the purposes of this invention. In the present application the syphon is started by an air blast and as the flow is established through the syphon the back pressure caused thereby is used to stop the air supply, the syphon itself being stopped by an air nozzle controlled by the liquid level in the receiving tank. The air supply to the venturi which is subject to control by a timing mechanism may be controlled by synchronized valves which always rotate in the same direction. In the electric system, electro-pneumatic valves, operated by a time controlled mechanism control the air supply for starting the Venturi syphon and thus operate the syphons for each tank at any time desired and operates them in any order desired for the different tanks.

In the drawings, 11, 12 and 13 is a syphon tube of the usual form which connects at 14 with the Venturi nozzle 15 through the enlarged annular space 17 in which the air nozzle 16 projects in line with the discharge passage 18. An air pipe 19 and 20 connects with the nozzle 16 so that the syphon may be started by an air blast.

Cylinder 21 is connected to air pipe 19 and has a piston 22 with a piston rod 24 projecting from the cylinder and normally held in the inner position by spring 23. The cylinder 21 is mounted upon the upper end of the nozzle with the air connection between the nozzle and the cylinder. The plunger 24 is operated once only at the starting of the syphon and operates a stepping mechanism. A rotary valve, Fig. 2, is mounted on top of the cylinder and constitutes the stepping mechanism to be operated by the piston rod 24. This comprises the frame 25, 26. The leg 26 is clamped to the end plate 27 by the nut 28 and the body of the valve 29 is screwed into the end plate. The valve member 30 rotates in the body 29, through the shaft 31 which is keyed to the stepping wheel 32 and this wheel is provided with ratchet dogs 33, 34, which lie in the path of the piston rod 24 so that for each upward movement of the rod the stepping wheel and the valve member 30 are moved one quarter turn.

The pipes 35 and 36 are connected alternately with an air supply hereafter to be described. The opening 37 in valve 30 registers with pipe 35 so that if air is supplied to this pipe the interior of 30 will be under air pressure and pipe 20 connecting to this interior will be under air pressure. Opening 38 registers with pipe 36 so that when wheel 32 makes one quarter turn, the port 37 is moved away from pipe 35 and port 38 is brought into alignment with pipe 36 and the interior of valve 30 is subject to the pressure in pipe 36, while pipe 35 is cut-off. When another quarter turn has been made, port 39 is brought into alignment with pipe 35 and pipe 36 is cut-off. Thus, alternately, pipes 35 and 36 are connected with the interior of valve 30 and with pipe 20 leading to the venturi. Only one of pipes 35 and 36 are under air pressure at a time so that as soon as the piston rod 24, in response to the liquid flow through the syphon steps the valve 30 one step, the air pressure for that operation is thereby cut-off. A synchronized stepping valve arrangement of this kind, but used for another purpose is disclosed in U. S. Patent 1,627,567, May 10, 1927.

The syphon tube 13 is provided with a nozzle at 41, in which the air tube 44 connects to an annular space 43 in which the nozzle 42 is centered. A restricted nozzle 42 appears to cause an increase in the flow of the liquid which tends to vacuum the space 43 and pipe 44. The result is that when pipe 44 is closed a sub-atmospheric pressure is created in this pipe and the syphon is maintained, but when pipe 44 is opened, the syphon is immediately interrupted.

The syphon may be broken by admitting air to tube 44 through valve 50. This valve may be operated by the level of the liquid in the receiving tank, as in the co-pending application above referred to.

In the automatic system in Fig. 3, tanks B and D are alternately filled from tank A. An air reservoir 69 for operating the syphons may be supplied with compressed air from the pump compressor, 65 which operates by the fluid from the nozzle 15 entering at 66 and discharging at 67 into tank D. This compressor connects by pipe 68 to reservoir 69.

The clock mechanism through 72 drives the rotary valve member 73 which has one face placed against disc 71 which connects by pipe 70 with air reservoir 69. The disc 80 having the pipe connections is mounted on the opposite side of the rotary valve 73. The face of the rotary valve 73 adjoining 71, and the relative position of the pipes is shown to the right. The valve rotates about the stem 74 and has ports 75 and 76 which register with the pipe 77 connected to pipe 20a for operating the syphon to discharge the tank D or any other tank desired. When either of these ports register with 77 air is supplied from reservoir 69 to start the syphon.

Ports 78, 79 and 79a register with the outer row of tubes as the valve rotates to supply air from the reservoir to each of these pipes in turn. Two sets of pipe 35 and 36 go to each venturi, as in Fig. 1, but only one of the ports can register with one of a pair of pipes at a time, and each pipe of the pair are alternately in register. The result is that if pipe 36 is under air pressure, pipe 35 is cut off so that when valve 30 is rotated to cut-off the air pipe, the other pipe that is brought into circuit has no air pressure until valve 73 rotates to bring it into register with the next port, and in the next operation these conditions are reversed. The system thus operates by a synchronous operation of valves 30 and 73. The system could be operated by a one way valve, but the synchronous system avoids a reverse movement in the valve operation.

Figure 4:
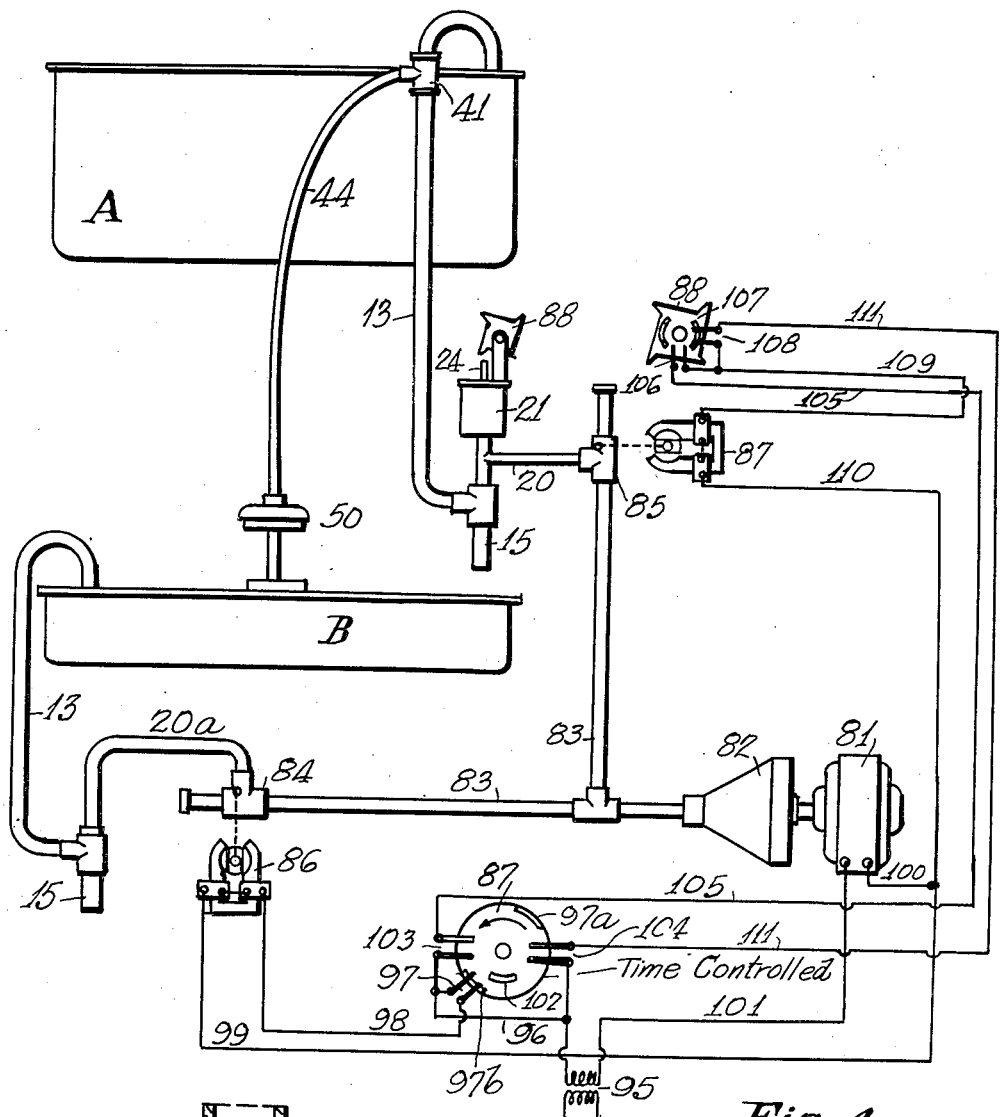
Fig. 4 is another diagram of the Venturi syphon control operated electrically.
Figure 5:
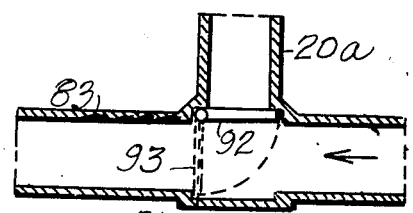
Fig. 5 is one form of an electrically operated air valve that may be used with Fig. 4, the drawing being partly sectioned.

In the electric system in Fig. 4 a motor operated blower supplies air for operating the system and electrically operated valves direct the air stream to the particular syphon desired. The valve is operated as indicated in Fig. 5, in which the magnetic yoke 86 rotates the armature 90 and through connection 91 operates the shutter 92 so that it may close the passage to pipe 20a in the normal position as indicated, or rotate the shutter to close pipe 83 as indicated at 93 when the magnet is energized.

The energy supplied from transformer 95, through connection 96 contact fingers 97 bridged by 97a or 97b on the time controlled disc 87, establishes a circuit to wire 98, magnet 86, wire 99, wire 100, motor 81 and wire 101 to transformer. The magnet 86 is energized in series with motor 81, which turns the air stream from blower 82, through pipe 83 and pipe 20a into the venturi for discharging tank B, when 87 is in the position shown.

The disc 87 has another contact 102 which engages the fingers 103 and 104 as it rotates. When it bridges the fingers 104, a circuit is established from wire 96, through wire 111, contact fingers 108, bridged by contact 107, on the star wheel 88 operated by piston 24, wire 109, magnet 87, wire 110, wire 100, motor 81 and wire 101 to 95. The magnet 87 is energized with the motor 81 and through pipe 83 and valve 85 an air blast is provided to start the syphon from tank A to tank B. When the syphon is started, the star wheel 88 is moved to interrupt the circuit at 108 and to establish another circuit across the fingers 106 which connect with wire 105 to fingers 103. This circuit remains deenergized until 102 bridges fingers 103 for another operation of the syphon. This provides a synchronous control between 87 and 88 for the operation of the syphon. The contact members 97a and 97b on disc 87, engage fingers 97 only and contact 102 engages fingers 103 and 104 only.

It should be understood that the time controlled contacts are arranged to set up the required circuits in the sequence necessary for the filling and emptying of the tanks desired.

The term "venturi" is used in a generic sense herein to include nozzles that produce a subnormal air pressure by the flow of an air stream.

The drawings are largely diagrams used to illustrate the operation of the system, rather than the actual apparatus which must be designed for the conditions under which it is to be applied. For instance, with certain types of Venturi nozzles it is found, in practice that a relatively large volume of air at a medium pressure will start the syphon just as effectively as air at higher pressures. When the syphon is started the liquid continues to flow through the nozzle, but if the air pressure is continued the liquid flow is much faster than without the air pressure. The discharge of air under pressure with the liquid through the nozzzle atomizes the liquid, if the liquid can be readily atomized.

When the syphon is established the air and the liquid flow through the same discharge nozzle at 18 and the liquid has viscosity which retards the discharge of the air. The extent to which the air is retarded depends upon the quantity of liquid which the nozzle is designed to pass into the discharge orifice 18. Since the Venturi nozzle operates on the principle of an injector pump, the free flow of the air through the nozzle is retarded by the flow of the liquid which corresponds with the reaction of the pump. As applied in Fig. 1, the nozzle at 16 is smaller than the feed pipe 20 thereby causing an increased air velocity through the nozzle and a back pressure which builds up against piston 22 in cylinder 21 and partially compresses spring 23, but not sufficient to operate valve 29. When the liquid flows through the nozzle the retardation to the air stream is further increased with a corresponding increase in back pressure in cylinder 21. The spring 23 is constructed to be responsive to this back pressure to the extent that the plunger 24, under the accumulated back pressure operates valve 29 and shuts off the air supply to the nozzle. This is only one way of applying the control.

In the valve construction in Fig. 2, the air supply is shut off by the last movement of the valve, but in the construction in Fig. 4 the shut off is determined by the length of the contact segment 107. Only four steps are shown in the stepping mechanisms of the drawings, requiring a quarter turn for each operation. The expansion of the accumulated air in cylinder 21 can be applied to secure a complete operation of the stepping device, but if desired a strong completing mechanism as shown in U. S. Patent No. 1,778,328, October 14, 1930, may be embodied in the stepping device to complete its movement after the movement is initiated.

This construction provides a syphon with a starting mechanism which is automatically discontinued by the flow of the syphon.

Having thus described my invention, I claim:

1. A syphon system comprising a syphon, a Venturi nozzle for starting said syphon, an air supply for said nozzle, a valve controlling said air supply and means operated by the back pressure of said nozzle when the liquid flows therein for cutting off said air supply.

2. A syphon system comprising a syphon tube, a Venturi nozzle for starting said syphon, an air supply for said nozzle, a synchronized system controlling said air supply and means for operating said system by the flow of liquid through said nozzle.

3. In a syphon system, in combination, an upper tank and a lower tank, a syphon tube connecting said tanks, pneumatic means for starting the syphon, electrical means for operating said pneumatic means, time controlled means controlling said electrical means and means for stopping said syphon operated by the liquid level in the lower tank.

4. In a liquid controlling system, a delivery tank located at a high level, a receiving tank located at a low level, a pipe connecting said tanks, a second pipe connecting the receiving tank to waste, means for regulating the flow of liquid from the delivery to the receiving tank, means for regulating the flow of liquid from the receiving tank to waste and time controlled means for operating said regulating means.

5. In a liquid controlling system, a delivery tank located at a high level, a receiving tank located at a low level, a pipe connecting said tanks, a second pipe connecting said receiving tank to waste, electrically operated means for regulating the flow of liquid between the delivery and receiving tanks, electrically operated means for regulating the flow of liquid from the receiving tank to waste and means controlling said electrically operated means to operate in cycles.

6. In a liquid control system, a tank, a syphon pipe located in said tank, a nozzle in said pipe for starting the syphon and translating means connected with said nozzle and responsive to back pressure caused by the liquid flow in said nozzle for affecting the operation of the syphon.

7. In a liquid control system, a tank, a syphon pipe located in said tank, a nozzle in said pipe for starting the syphon and a cylinder having a plunger connected with said nozzle and a translating device operated by said plunger.

8. In a liquid control system, a tank, a syphon pipe in said tank, a nozzle in said pipe associated with the operation of the syphon, a rotary valve and means connected with said nozzle for operating said rotary valve.

9. In a liquid control system, a tank, a syphon pipe in said tank, a nozzle in said pipe associated with the operation of said syphon, a stepping mechanism connected with said nozzle and means for operating said mechanism one step each time the syphon operates.

10. An article of manufacture comprising a Venturi nozzle for a syphon with a cylinder and piston connected at the upper end of the nozzle, an air connection between the cylinder and the nozzle and a translating device operated by said piston.

11. In a liquid control system, a tank, a syphon pipe located in said tank, a nozzle in said pipe for starting the syphon, an air supply for said nozzle, means connected with said nozzle responsive to the flow of liquid through said nozzle and means controlling said air supply by said responsive means.

12. A liquid control system as in claim 11, with a time controlled mechanism also controlling the air supply.

13. A liquid control system comprising a tank, a syphon pipe in said tank, a nozzle in said pipe for starting the syphon, an air supply for said nozzle and a time operated mechanism controlling said air supply.

14. In a liquid control system, a liquid supply, a plurality of receiving tanks, a pipe connecting each of said receiving tanks with said supply, means in each pipe controlling the flow of liquid therein, selective means for operating said controlling means and a time operated mechanism controlling said selective means.

15. In a liquid control system, a plurality of tanks, a syphon pipe with a nozzle connected with each tank, an air supply pipe, a valve connecting said air supply pipe with each nozzle to operate the syphons and means for selectively operating said valves.

16. In a liquid control system, a tank, a pipe with a nozzle connected with said tank, pneumatic means connected with said nozzle for starting the flow of liquid through said pipe and a time controlled mechanism controlling the operation of said pneumatic means.

17. An article of manufacture comprising a Venturi nozzle for a syphon, an expansion chamber connected with the upper end of the nozzle with means for contracting said chamber and an air connection between the expansion chamber and the nozzle for starting the syphon.

18. In a syphon system, in combination, an upper tank and a lower tank, a syphon tube connecting said tanks, a second syphon tube for discharging the lower tank, pneumatic means for starting said syphons, electrically operated means for operating said pneumatic means, and time controlled means for operating said electric means at intervals.

MATTHEW H. LOUGHRIDGE.

CERTIFICATE OF CORRECTION.

Patent No. 2,171,579. September 5, 1939.

MATTHEW H. LOUGHRIDGE.

It is hereby certified that error appears in the printed specification of the above numbered patent requiring correction as follows: Page 3, first column, line 5, for the word "strong" read stroke; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.